(12) United States Patent
Himelstein et al.

(10) Patent No.: US 9,943,765 B2
(45) Date of Patent: Apr. 17, 2018

(54) FANTASY SPORT LINEUP BUILDER

(71) Applicant: Score Fantasy Sports Inc., Toronto (CA)

(72) Inventors: Matthew F. Himelstein, Soda Springs, CA (US); Michael S. Ferguson, San Francisco, CA (US); Vladimir K. Kozyrev, San Francisco, CA (US); William R. Wright, San Francisco, CA (US)

(73) Assignee: Score Fantasy Sports Inc., Toronto (CA)

( * ) Notice: Subject to any disclaimer, the term of this patent is extended or adjusted under 35 U.S.C. 154(b) by 124 days.

(21) Appl. No.: 14/664,723

(22) Filed: Mar. 20, 2015

(65) Prior Publication Data

US 2015/0265931 A1    Sep. 24, 2015

Related U.S. Application Data

(60) Provisional application No. 61/968,264, filed on Mar. 20, 2014.

(51) Int. Cl.
*A63F 9/24* (2006.01)
*A63F 13/828* (2014.01)
*A63F 13/30* (2014.01)

(52) U.S. Cl.
CPC ............ *A63F 13/828* (2014.09); *A63F 13/30* (2014.09)

(58) Field of Classification Search
CPC .................................................. A63F 13/828
See application file for complete search history.

(56) References Cited

U.S. PATENT DOCUMENTS

| | | | |
|---|---|---|---|
| 6,371,855 B1 * | 4/2002 | Gavriloff | A63F 13/12 463/1 |
| 6,884,166 B2 | 4/2005 | Leen et al. | |
| 6,887,151 B2 | 5/2005 | Leen et al. | |
| 6,899,628 B2 | 5/2005 | Leen et al. | |
| 7,029,394 B2 | 4/2006 | Leen et al. | |

(Continued)

OTHER PUBLICATIONS

Draftkings, image post date Jan. 15, 2013, site visited Feb. 1, 2017, (online), web.archieve.org/web/20130115200527/https://www.draftkings.com.

(Continued)

*Primary Examiner* — Steve Rowland
(74) *Attorney, Agent, or Firm* — Dorsey & Whitney LLP

(57) ABSTRACT

Disclosed is a method for creating a fantasy sport team. The method may include receiving a user input for a fantasy sport contest that is associated with one or more real-life sporting events that are scheduled to occur, in which a plurality of athletes are scheduled to play in first and second player positions, and displaying athletes that are scheduled to play in the first player position in the scheduled sporting events based on the selected contest. The method may include receiving a user input selecting a first athlete, and upon the receiving the user input selecting the first athlete, automatically displaying a plurality of selectable second athletes that are scheduled to play in the second player position in the scheduled sporting events. The method may include receiving a user input selecting a second athlete, and displaying a fantasy user team that includes the selected first and second athletes.

21 Claims, 5 Drawing Sheets

(56) References Cited

U.S. PATENT DOCUMENTS

| | | | |
|---|---|---|---|
| RE39,818 E | 9/2007 | Slifer | |
| 8,142,283 B2 | 3/2012 | Lutnck et al. | |
| 8,342,924 B2 | 1/2013 | Leen et al. | |
| 8,512,129 B2 | 8/2013 | Ginsberg et al. | |
| 8,641,511 B2 | 2/2014 | Ginsberg et al. | |
| 2007/0054718 A1* | 3/2007 | Del Prado | A63F 13/792 463/1 |
| 2007/0243917 A1* | 10/2007 | Wojewoda | A61F 13/12 463/9 |
| 2008/0051201 A1* | 2/2008 | Lore | A63F 13/12 463/42 |
| 2008/0064490 A1* | 3/2008 | Ellis | H04N 5/44543 463/25 |
| 2008/0287198 A1* | 11/2008 | Callery | G07F 17/3276 463/42 |
| 2012/0115585 A1* | 5/2012 | Goldman | G07F 17/3272 463/25 |
| 2012/0149473 A1* | 6/2012 | Moore | G07F 17/3237 463/42 |
| 2013/0079130 A1* | 3/2013 | Takacs | A63F 13/12 463/31 |
| 2013/0282551 A1 | 10/2013 | Keiser et al. | |
| 2013/0303291 A1* | 11/2013 | Hughes | G07F 17/3276 463/42 |

OTHER PUBLICATIONS

Fanduel, image post date Dec. 17, 2013, site visited Feb. 1, 2017, (online), https://web.archieve.org/web/20131225000004/https://www.fanduel.com/.

\* cited by examiner

FANTASY SPORT LINEUP BUILDER

CROSS-REFERENCE TO RELATED APPLICATION

This application claims the benefit of the earlier filing date of U.S. Provisional Application 61/968,264 entitled, "SWOOPT," filed on Mar. 20, 2014, which is hereby incorporated by reference in its entirety.

TECHNICAL FIELD

The present invention relates generally to fantasy sports, and more particularly, in one or more illustrated embodiments, to creating a fantasy sport team.

BACKGROUND

Fantasy sports have recently been developing contest that allow users to create virtual teams of real athletes and compete against other virtual teams based on the performance of the athletes in one or more real-life athletic competitions. For example, players from a variety of athletic teams are selected by a user to "play" on his or her fantasy team, this selection process may be known as a "draft" if done at the beginning of a particular league or fantasy competition or trading if done at some time after the beginning of the fantasy league. Users typically select players based on the player's current, past, and predicted future performance, as well as the current position and athletic team of the player. After fantasy team selection, typically fantasy leagues include a competition between two or more fantasy teams. During the competition, each of the fantasy teams accrue points based on the athletic actions of the players in one or more athletic competitions. For example, certain athletic actions, such as a stolen base in baseball, a touchdown catch in football, and so on, may be assigned certain point values and when a player on a fantasy team accomplishes the actions in the athletic competition, the fantasy team may be awarded points based on those actions. After an allotted time amount or completion of the one or more athletic competitions, the fantasy team with the most points may be the winner.

One challenge with existing fantasy teams programs is that they require users to navigate through numerous screens to create a fantasy team. This has been found to increase the amount of time users need during the team-selection process, confuses some users, and increases the processing power required to host and run the fantasy team program as multiple screens and options are required for each fantasy team selection. Also, these conventional programs are cumbersome to a user and lead t user attrition, as some users fail to complete the process and abandon the game due to the multiple screens.

SUMMARY

In one embodiment a method for creating a fantasy sport team is disclosed herein. The method includes receiving a user input for a fantasy sport contest that is associated with one or more real-life sporting events that are scheduled to occur, in which a plurality of athletes are scheduled to play in first and second player positions; based on the selected contest, displaying athletes that are scheduled to play in the first player position in the scheduled sporting events; receiving a user input selecting a first athlete; upon the receiving the user input selecting the first athlete, automatically displaying a plurality of selectable second athletes that are scheduled to play in the second player position in the scheduled sporting events; receiving a user input selecting a second athlete; and displaying a fantasy user team that includes the selected first and second athletes.

In another embodiment, a method for creating a fantasy sports team is disclosed. The method includes receiving data for one or more real-life sporting events that are scheduled to occur, in which a plurality of athletes are scheduled to play in first and second player positions; receiving a user input for a fantasy sport contest that is associated with the scheduled sporting events and the plurality of athletes; based on the selected contest, determining athletes that are scheduled to play in the first player position in the scheduled sporting events; presenting for display the athletes that are scheduled to play in the first player position in the scheduled sporting events; receiving a user input selecting a first athlete; upon the receiving the user input for the selected first athlete: determining a plurality of selectable second athletes that are scheduled to play in the second player position in the scheduled sporting events; automatically presenting for display the plurality of selectable second athletes; receiving a user input selecting a second athlete; and presenting for display a fantasy user team that includes the selected first and second athletes.

In yet another embodiment, a system for creating a fantasy sport team is disclosed herein. The system includes one or more processors and a memory component, the memory containing executable instructions that, when executed by the one or more processors causes the one or more processors to receive data for one or more real-life sporting events that are scheduled to occur, in which a plurality of athletes are scheduled to play in first and second player positions; receive a user input for a fantasy sport contest that is associated with the scheduled sporting events and the plurality of athletes; based on the selected contest, determine athletes that are scheduled to play in the first player position in the scheduled sporting events; present for display the athletes that are scheduled to play in the first player position; receive a user input selecting a first athlete; upon receiving the user input selecting the first athlete, automatically determine a plurality of selectable second athletes that are scheduled to play in the second player position in the scheduled sporting events; present for display the plurality of selectable second athletes; receive a user input selecting a second athlete; and present for display a fantasy user team that includes the selected first and second athletes.

In still another embodiment a method for creating a fantasy sport team is disclosed herein. The method includes receiving, by one or more processors, a user input for a fantasy sport contest associated with scheduled sporting events, in which a plurality of athletes are scheduled to play in first and second player positions; based on the selected contest, displaying, by the one or more processors, athletes that are scheduled to play in the first player position in the scheduled sporting events; receiving, by the one or more processors, a user input selecting a first athlete; upon receiving the user input selecting the first athlete, automatically displaying, by the one or more processors, a plurality of selectable second athletes that are scheduled to play in the second player position in the scheduled sporting events; receiving, by the one or more processors, a user input selecting a second athlete; and displaying, by the one or more processors, a fantasy user team that includes the selected first and second athletes.

Figure 1:
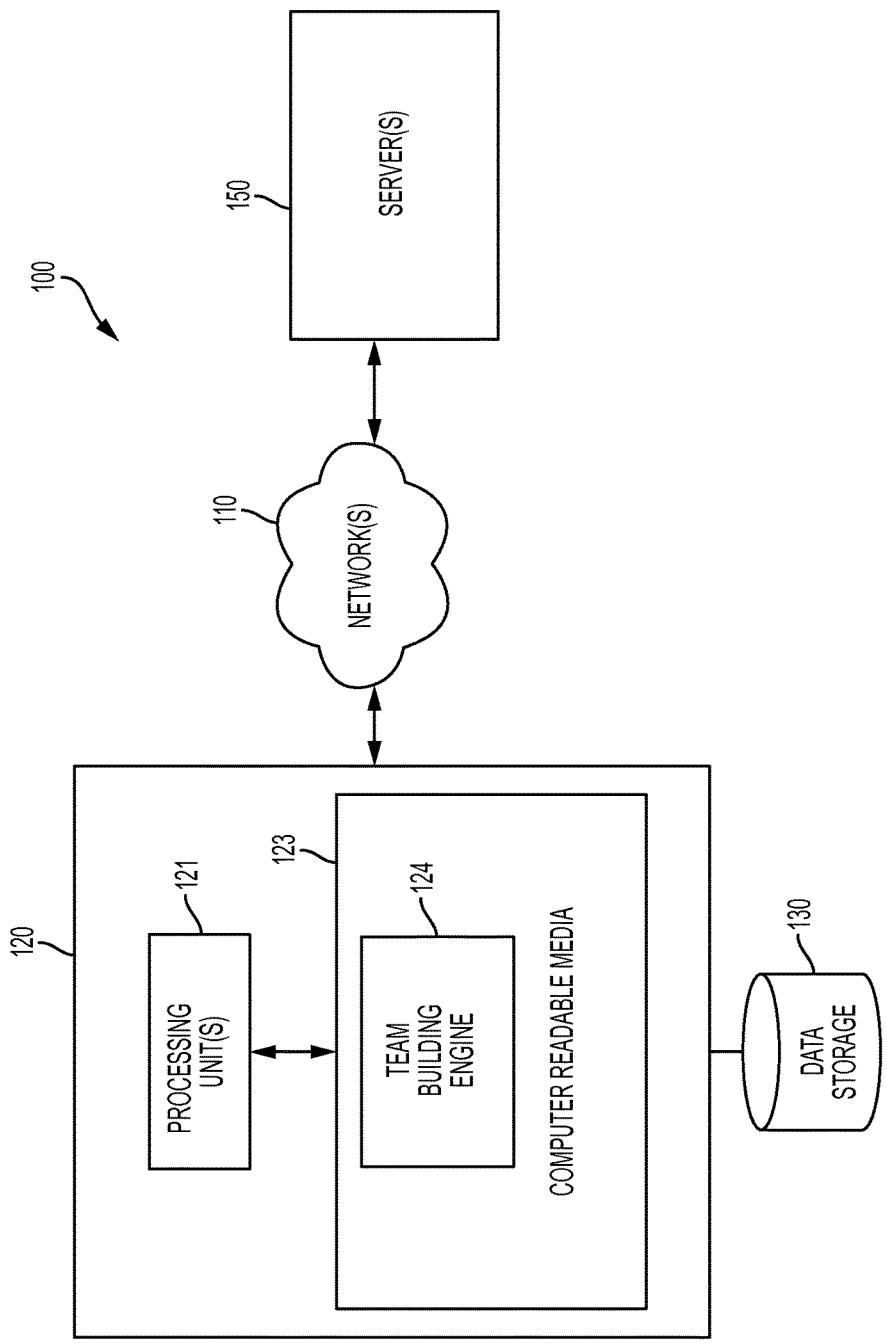
FIG. 1 illustrates a block diagram for a fantasy sport creation system.

The set of examples is provided by way of illustrating example implementations to aid in understanding and is not intended to, nor should it be interpreted as, limiting in any way.

DETAILED DESCRIPTION OF THE DRAWINGS

Certain details are set forth below to provide a sufficient understanding of embodiments of the invention. However, it will be clear to one skilled in the art that embodiments of the invention may be practiced without various aspects of these particular details. In some instances, well-known circuits, control signals, timing protocols, computer system components, and software operations have not been shown in detail in order to avoid unnecessarily obscuring the described embodiments of the invention.

The present disclosure is related generally to a fantasy sport team building system that expedites the team selection process, increasing the efficiency of the fantasy sport team system and process, as well as reducing the processing power required to operate the fantasy sport team, allowing the fantasy sport team system to be hosted on a mobile platform. In one embodiment, the fantasy sport team building system receives a user's first athlete selection for his or her team and based on this first selection and in particular, the position of the first athlete, automatically displays one or more second athletes that may play a different position than the first athlete. Alternatively, in some embodiments, the system may display athletes corresponding to the same position. For example, depending on the type of contest, e.g., in a five or nine person contest, a user may have the option to select two players of the same position and in these embodiments the next position shown may be the same as the first position. This allows a user to quickly add players to his or her fantasy team rooster that fill the open positions, without requiring the user to return to a home screen or initial selection screen after each athlete selection. The fantasy sport team building system thus expedites the team selection process and allows the fantasy sports program to run faster and operate more efficiently than conventional fantasy sport platforms.

The fantasy sport team system of the present disclosure also includes contest value and player value information, such as a total team salary and a player's individual salary to allow users to make informed decisions during the team selection process. For example, particular athletes may be highlighted, shaded, or the like to indicate that they are unaffordable for a particular user. As another example, each athlete may include an icon or salary data next to their name indicating the costs to the user if the athlete is selected.

Additionally, in some embodiments, the fantasy sport team system may enforce eligibility requires for certain athletes. For example, the system may prevent a fantasy team from including only athletes that play for the same real-life team or that are participating in the same real-life athletic competition. In some instances the system may be used for fantasy competitions related to a single athletic game or a series of games and enforcing these types of eligibility requirements helps users to select broader teams and untie the fantasy outcome from that of the real-life athletic competition.

By using the method of the present disclosure, fantasy leagues and teams can be created more easily on mobile devices, such as smart phones, portable gaming devices, and the like, where scrolling between multiple different screens and menus can be difficult and hard to do on the typically smaller display screens incorporated with mobile devices (as compared to laptop or desktop computers).

Turning to the figures, the fantasy team system will now be discussed in more detail. FIG. 1 illustrates a fantasy sport team building system 100 according to an embodiment of the present invention. The team building system 100 may include a network 110, a computing device 120, a data storage 130, and a server 150.

The computing device 120 may comprise any computing device known in the art, including but not limited to, a modem, a router, a gateway, a server, a thin client, a laptop, a desktop, a computer, a tablet, a media device, a smart phone, cellular phone, portable gaming device, set top box, or other mobile device, or any combination or sub-combination of the same. The computing device 120 may include one or more processing units 121 and computer readable media 123. The computer readable media 123 may be encoded with executable instructions and/or data structures that may operate in conjunction with one or more processing units 121 of the computing device 120 to provide functionality allowing execution of one or more instructions, such as those included in a team building engine 124. Although the executable instructions for the team building engine 124 are shown on a same computer readable media 123, in some embodiments any or all sets of instructions may be provided on multiple computer readable media and may not be resident on the same media. Accordingly, computer readable media 123 as used herein includes one or more computer readable media 123. Computer readable media 123 may include any form of computer readable storage or computer readable memory, transitory or non-transitory, including but not limited to externally or internally attached hard disk drives, solid-state storage, tiered storage solutions, storage area networks, network attached storage, and/or optical storage.

As described, the instructions stored on the computer readable media 123 may be executed using the one or more processing units 121, or other processing units. The executable instructions for the team building engine 124 may be referred to as a "team building engine" herein, where the "team building engine" refers to the executable instructions for a team building engine 124 and the one or more of the processing units 121 or other processing units used to execute the instructions to perform the actions described.

Data storage 130 may be accessible to the team building engine for storage of data provided (e.g., generated) or received by the team building engine. Data storage 130 may store grammatical rules used by the team building engine 124 in some examples. Data storage 130 may further store attributes of various terms in a variety of languages (e.g. part of speech, conjugation), such that the team building engine 124 may generate grammatically correct terms as described in examples herein. In some embodiments, data storage 130 may be included in computer readable media 123, however, data storage 130 may also be stored in other locations, such as on a disk accessible to the team building engine. The data storage 130 may be substantially any type of memory component, such as but not limited to, volatile, non-volatile storage, a magnetic storage medium, optical storage medium, magneto-optical storage medium, read only memory, random access memory, erasable programmable memory, flash memory, and/or a combination of one or more types of memory components.

The computing device 120 may be configured to communicate over the network 110 with any number of devices, including but not limited to the other components of the fantasy sport team building system 100 described herein. The network 110 may comprise one or more networks, such as local area networks (LANs), wide area networks (WANs), metropolitan area networks (MANs), cellular networks, and/or the Internet or other wireless communication systems (e.g. Bluetooth). Communications provided to, from, and within the network 110 may be wired and/or wireless, and further may be provided by any networking devices known in the art, now or in the future.

The server 150 may comprise a server configured to provide data (e.g., fantasy sports data such as player information, athletic competition information, and so on) to and/or receive from data from the computing device 120. In some embodiments, for example, the server 150 may be configured to stream, transmit, or otherwise provide data to the computing device 120 such that the data may be utilized by the computing device 120. The server 150 may provide data about real-life sporting events, such as scores of games and actions performed by players in such events. The server 150 may further manage registration of users of the team building engine, or any other online functionality provided by use of the team building engine.

In at least one example, the team building engine may include an application having a linear, interactive user interface which enables a user to build fantasy sport teams in a sequential and streamlined manner, thus improving the efficiency of fantasy sports team creation. In one embodiment, the team building engine 124 may permit the user to generate fantasy sports teams using a sequenced, linear method, whereby pluralities of real-life athletes are displayed according to their positions in the sports events. For example, the team building engine 124 may display a plurality of athletes that are scheduled to play a first position in one or more scheduled sports events. When a user selects or "drafts" a first athlete of the plurality of athletes, the team building engine 124 may automatically display another plurality of athletes that are scheduled to play a second position in the scheduled sports events. In some embodiments, when a user selects a second athlete from the other plurality of athletes, the team building engine 124 may automatically display another plurality of athletes that are scheduled to play a third position in the scheduled sports events. The sequence of these pluralities of athletes may be predetermined by the team building engine 124 based on the fantasy sport contest in which the user is participating. Thus, unlike previous systems that require a user to select a particular player position each time the user drafts another athlete, the disclosed system offers a streamlined athlete drafting process, thus improving the efficiency and overall user experience, as well as allowing the fantasy sports team program to run and operate on a mobile platform.

The team building engine may include instructions for enforcing a contest value limit (e.g., a salary limit or budget). For example, the team building engine may cause the user interface to display athletes in a manner that is indicative of whether or not within each athlete's player value (e.g., salary) is within the user's remaining contest value limit (e.g., salary limit). Thus, the team building engine improves the efficiency and user experience of building a fantasy sport team.

As described, the team building engine 124 may operate on the computing device 120. In some examples, the team building engine may be stored on the computing device such that network activity is not required for the team building engine to operate. In other examples, the team building engine may require communication with the server 150, or any other server, to operate. This may, for instance, ensure only registered or otherwise authorized users operate the team building engine. In yet another example, the team building engine may be partially or fully stored on one or more other devices, such as the server 150, such that the team building engine operates as a cloud-based application. By way of example, a user may utilize a web browser to access the team building engine remotely.

Figure 2:
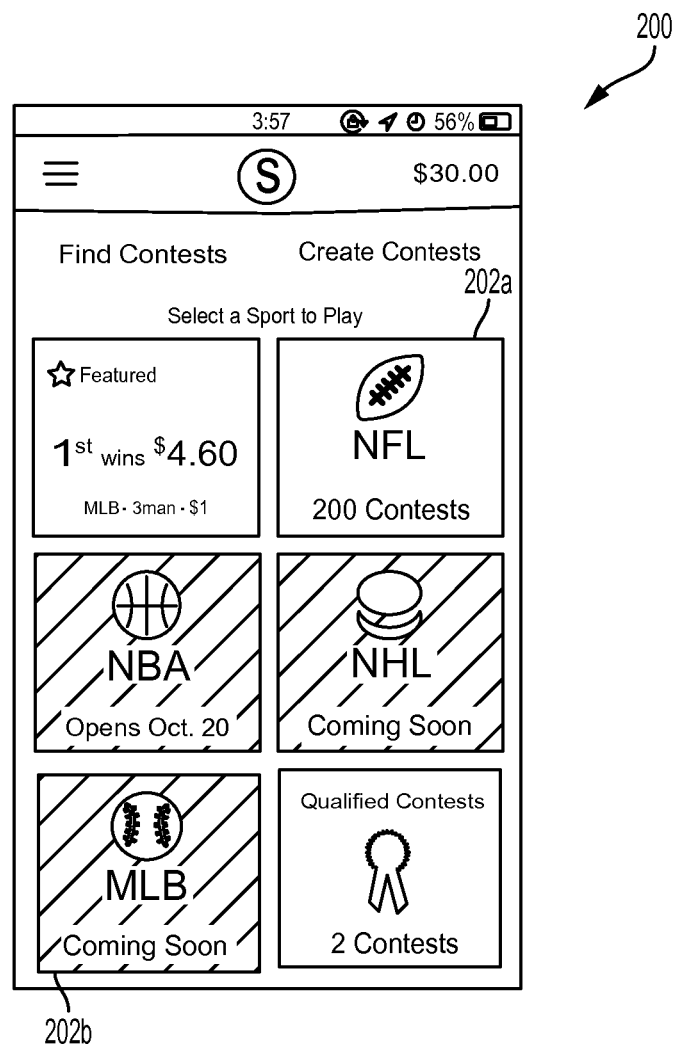
FIG. 2 illustrates a screenshot of an exemplary find-contest screen.

When the team building engine is launched, it may initiate a find-contest phase and execute instructions for allowing a user to select a fantasy sport contest, as shown in FIG. 2. A find-contest screen 200 may include contest buttons (e.g., 202a, 202b) selectable by a user to choose a particular fantasy sport contest. For example an NFL contest button 202a may allow a user to build a fantasy football team, based on real-life national football league (NFL) athletes and games, and a MLB button 202b may allow a user to build a fantasy baseball team, based on real-life major league baseball (MLB) athletes and games.

Figure 3:
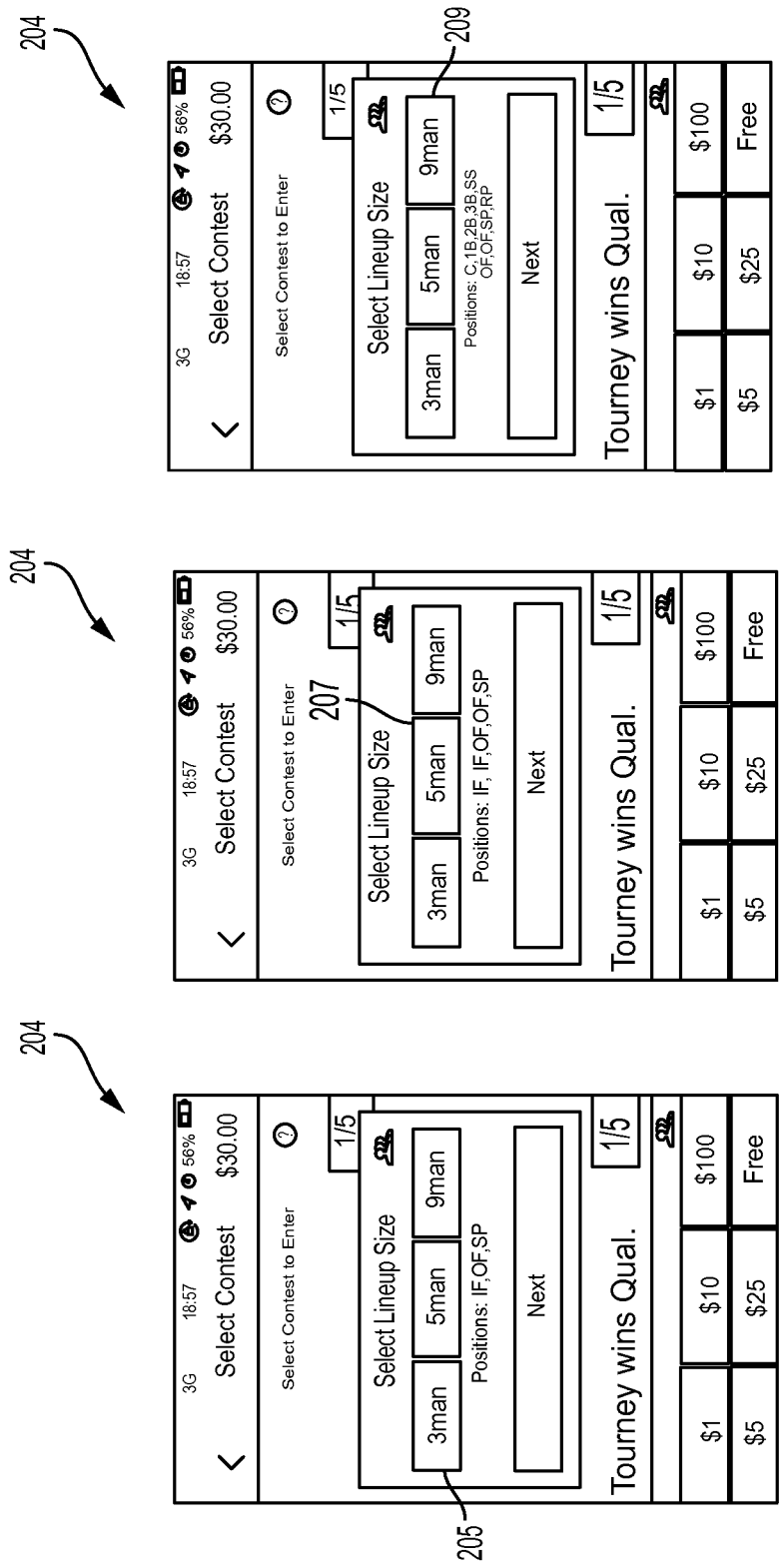
FIGS. 3A-3C illustrate various examples of screenshot of an exemplary select lineup screen for the fantasy sport creation system.
Figure 4:
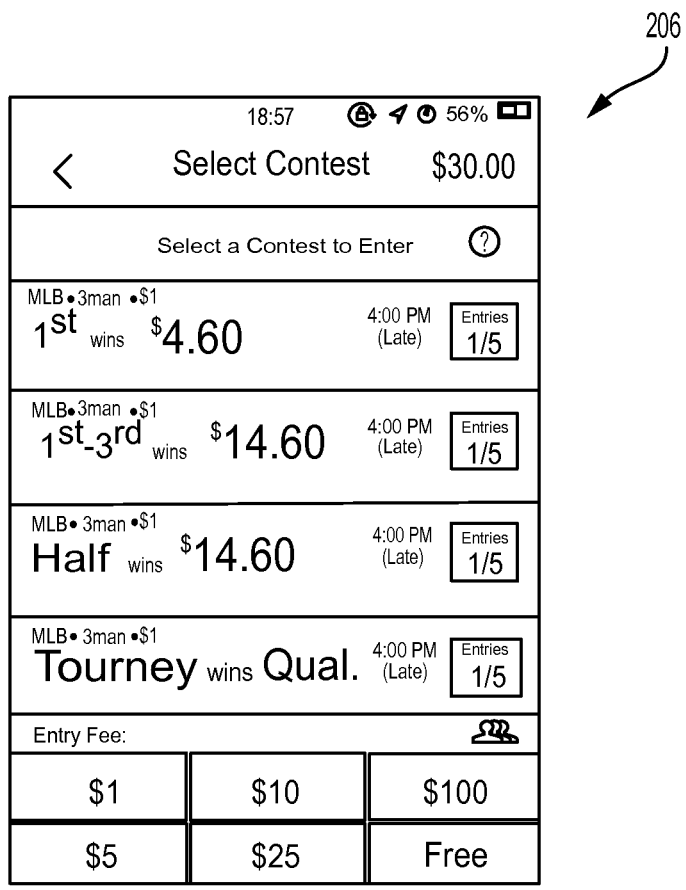
FIG. 4 illustrates a select contest screenshot for the fantasy sport creation system.

When a user selects (e.g., taps) on a contest button (e.g., the MLB contest button 202b) the team building engine 124 may bring a user to a select lineup screen 204, as shown in FIGS. 3A-C. In some embodiments, the select lineup screen 204 may include a 3-man lineup button 205, to allow a user to choose to build a 3-man sports team, a 5-man lineup button 207 to allow a user to choose to build a 5-man sports team, and a 9-man lineup button 209 to allow a user to choose to build a 9-man sports team. As will be described in more detail below, if the user selects the 3-man button 205 to build a 3-man fantasy MLB team, then the team building engine 124 may establish a predetermined sequence of screens for display to allow the user to select an infielder ("IF"), then an outfielder ("OF"), and then a starting pitcher ("SP"). If the user selects the 5-man button to build a 5-man MLB team, then the team building engine 124 may establish a predetermined sequence of screens for display to allow the user to select two infielders ("IF"), then two outfielders ("OF"), and then a starting pitcher ("SP"). Upon the user selecting a particular lineup in which to participate (e.g., by tapping on one of the lineup buttons via the select lineup screen 204), the team building engine 124 may present a select contest screen 206, as shown in FIG. 4. Upon the user selecting a contest in which to participate from the select contest screen 206, the team building engine 124 may present for display a fantasy sport lineup building screen 208, as shown in FIG. 5.

Figure 5:
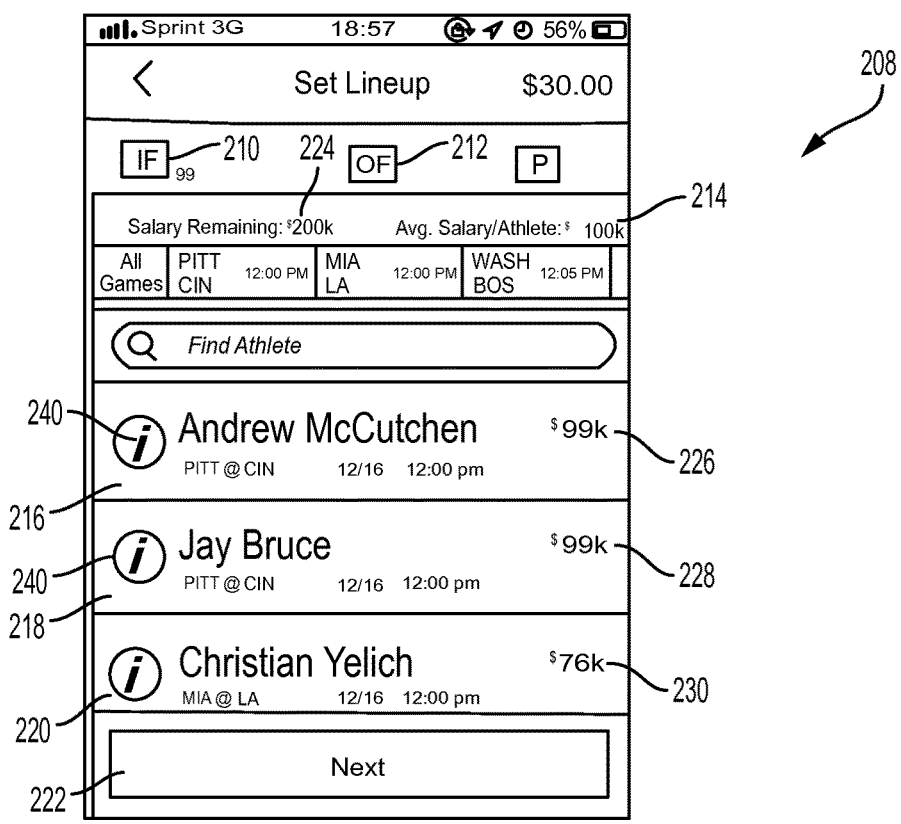
FIG. 5 illustrates a lineup building screen for the fantasy sport creation system.

FIG. 5 shows a lineup building screen 208 based on a user's selection of a MLB contest (e.g., via selection of button 202b on screen 200) and a 3-man lineup (e.g., selection of button 205 on screen 204). Based on these selections, the team building engine 124 has established a predetermined sequence of screens for display to allow the user to select an infielder ("IF"), then select an outfielder ("OF"), and then select a starting pitcher ("SP"). This sequence is shown on the team building screen 208 in FIG. 5 since the screen 208 shows, moving from left to right, a first player position button (IF, or infield button) 210, then a second player position button (OF, or outfield button) 212, and then a third player position button (P, or pitcher button) 214. It should be noted that position button 210, 212, 214 may change to indicate to a user the position of the athletes currently listed in the lineup screen 208. For example, when reviewing infielders such as shown in the lineup screen 208 of FIG. 5, the infielder player position button 210 may be bolded as compared to the other two position buttons 212, 214. Once a particular position is selected by a user, the lineup screen 208 may display only those athletes corresponding to that position, i.e., only those athletes that play the particular position.

FIG. 5 shows the lineup building screen 208 displaying athletes that are scheduled to play in a second player position in scheduled sporting events. For example, FIG. 5 shows the lineup building screen 208 after a user has selected from a previous lineup building screen 208 a first athlete for a first plurality of athletes. In the particular example shown in FIG. 5, the user has selected from the previous lineup building screen 208 an infielder, and thus FIG. 5 has automatically displayed a plurality of second athletes, which are outfielders (e.g., Andrew McCutchen, Jay Bruce, and Christian Yelich). Upon a user selecting one of the plurality of second athletes (e.g., by selecting button 216 to add Andrew McCutchen to the user's lineup, selecting button 218 to add Jay Bruce to the user's lineup, or selecting button 220 to add Christian Yelich to the user's lineup), the lineup building screen 208 will automatically display a next plurality of athletes corresponding to a next player position (e.g., display a plurality of pitchers from which the user can select to add to the lineup). Thus, the team building system 100 automatically takes the user through the selecting process, in an efficient and streamlined manner, without requiring the user to select a player position each time the user wants to select a respective player. The order of the player positions is variable and may change as desired. For example, in one embodiment, once an infielder has been selected, the athletes shown for the next position may be outfielders, and once an outfielder has been selected, the athletes for a pitching position may be displayed. However, in other examples, the order of positions to be field and the corresponding athletes may be modified as desired.

In addition to displaying the names of the athletes, the system may also display relevant information about each of the athletes available to be selected for a particular position. For example, by a user selecting the information icon 240, an athlete profile screen may be displayed including statistics and other information about the athlete. This feature allows users to make informed decisions about which athletes to select for a particular position. In addition to athletic statistics, the system may also display information about a particular athlete corresponding to the fantasy team. For example, each athlete icon or selecting button 216, 218, 220 may include fantasy salary information data 226, 228, 230 that corresponds to a fantasy salary for each player, i.e., the amount of money or points required by a team owner to place the particular player in his or her lineup.

To further assist a user during team selection, contest value information for the fantasy team may be included on the lineup building screen 208. The contest value information may include information such as a value assigned to the particular fantasy sport team, matchup, or competition. In other words, each fantasy team may for a particular fantasy competition may include a salary cap or value limit. The value limit defines the amount of points, money, or the like, that a particular user may spend on his or her fantasy lineup. The system may also assign player values to selectable players where the player values correspond to the amount or percentage of money, points, or the like, that a user will be required to spend to add a particular player to his or her lineup. The system may further track a user's spending throughout the lineup process so that as a particular athlete or player is selected, the player value may be deducted from the user's value limit, reducing the amount that a user has available to select additional players. Further, in some instances, the system may prevent a user from selecting a player having a player value that is more than the user's current or remaining budget or spending amount and/or may provide an indication that a particular player included in player list is unaffordable.

For example, with reference to FIG. 5, the contest value such as salary remaining information 224 and/or the average salary remaining per athlete information 214 may be displayed on the lineup building screen 208. This information assists a user in selecting a particular athlete as he or she can compare the salary cost of the player against not only the total salary left that he or she has for the lineup, but also the amount of salary remaining divided by the number of unfilled positions left in the lineup or draft. As an example, if the salary remaining is $200,000 and there are four positions that do not yet have athletes selected, the average salary remaining per athlete information 214 displayed would be $50,000 (e.g., $200,000/4). As shown in FIG. 5, as another example, if one player has been chosen for a three person contest and two more players are left to be selected and the remaining salary is $200,000, the average salary per athlete 214 is shown as $100,000.

Further, in some examples, the system may modify one or more aspects of the player selection button 216, 218, 220 based on the remaining salary information 224 to illustrate the affordability of particular players. For example, if a particular player's salary is over the remaining salary of the user (i.e., the player cannot afford the particular player), the player selection button 216, 218, 222 may appear greyed out or otherwise modified to indicate to the user that the player cannot be selected. In these instances the system may also refuse to add a player to a user's lineup he the user cannot afford the player, e.g., tapping on the player button 218, 220, 222 will cause a notification to pop up indicating that the player cannot be added to the lineup because he or she exceeds the remaining spending amount or remaining salary for the user's team.

With continued reference to FIG. 5, in some embodiments, the system may prevent a user from moving onto additional operations in the system until he or she has completed his or her lineup. For example, the next button 222 may be disabled until every position on the lineup has been filled by the user. Once a user has completed his or her lineup, the user may select the next button 222 and the system 100 may verify the eligibility of each of the players on the team. For example, after the user has completed his or her lineup and selected the next button 222, the processing element 121 varies that all the athletes selected for the team (i.e., those present in the lineup) are eligible. In this example, the system may include a rule that a fantasy lineup must include at least one player that plays on a different athletic team from the remaining players or that at least one of the players in the lineup will be participating in a different athletic competition from the other players (i.e., all the athletes in the lineup are not participating in the same real-life game or are not on the same real life team). As a specific example, if all of the players in a user's lineup are playing in a first game such as baseball game between Washington and Boston, the processing element 121 will display an error to the user stating that you must select athletes from at least two different sporting games or competitions. However, this is just one example of a player eligibility rule and other rules may be implemented as desired.

After the user's lineup has been created using the lineup screen 208 and each of the players on the user's team are eligible, the system proceeds to enter the fantasy team or lineup into the fantasy contest or competition. For example, a first user fantasy team may compete against a second user fantasy team over a particular time frame, one or more athletic competitions, or the like. In this example, the user team having the most points based on the actions of the various players in their respective athletic competitions may be determined to be the winner. In other words, the system 100 receives sports data from one or more real life athletic sporting events, such as, but not limited to, player statistics, game scores, injury lists, and so on, and uses that sports data to assign various points to players on each of the fantasy teams and based on those points the processing element 121 can compare two or more user teams to determine a contest winner.

CONCLUSION

The foregoing description has broad application. For example, while examples disclosed herein may focus on baseball athletes, many other athletes and athletic competitions may be included with the fantasy sports team system disclosed herein. Accordingly, the discussion of any embodiment is meant only to be exemplary and is not intended to suggest that the scope of the disclosure, including the claims, is limited to these examples.

What is claimed is:

1. A method of creating a fantasy sport team, comprising:
receiving by one or more processors a user input selecting a fantasy sport contest that is associated with one or more real-life sporting events that are scheduled to occur, in which athletes play in a plurality of player positions;
based on the selected contest, displaying on a screen athletes that are selectable for a first player position of the plurality of positions in the scheduled sporting events;
receiving by the one or more processors a user input selecting a first athlete from among the athletes that are selectable for the first player position;
upon the receiving the user input selecting the first athlete, and in response thereto:
determining by the one or more processors, free of user input, a second player position of the plurality of positions; and
automatically displaying on the screen athletes that are selectable for the second player position in the scheduled sporting events;
receiving by the one or more processors a user input selecting a second athlete from among the athletes that are selectable for the second player position; and
displaying on the screen a fantasy user team that includes the selected first and second athletes.

2. The method of claim 1, wherein the contest has a value spending limit associated therewith and each of the athletes has an assigned player value, and wherein the displaying on the screen the athletes that are selectable for the second player position further comprises displaying on the screen the athletes that are selectable for the second player position with an indication that they are affordable within a remaining spending amount, the remaining spending amount being the value spending limit less the player value of the first athlete.

3. The method of claim 2, wherein the plurality of athletes that are selectable for the second player position are displayed with a plurality of athletes un-selectable for the second player position the plurality of athletes that are un-selectable for the second player position including athletes scheduled to play in the second player position but having player values that exceed the remaining spending amount, and wherein the athletes that are un-selectable for the second player position are displayed with an indication that they are unaffordable within the remaining spending amount.

4. The method of claim 2, further comprising:
upon the receiving the user input selecting the second athlete, automatically displaying on the screen athletes that are selectable for a third player position of the plurality of positions in the one or more scheduled sporting events, wherein the athletes that are selectable for a third player position are displayed with an indication that they are affordable within a second remaining spending amount, the second remaining spending amount being the value spending limit less the player value of the first athlete and player value of the second athlete; and
receiving by the one or more processors a user input selecting a third athlete from among the athletes that are selectable for the third player position.

5. The method of claim 2, wherein the value spending limit comprises a salary limit, and wherein each of the assigned player values comprises a player salary.

6. The method of claim 1, wherein each of the athletes has an assigned player value, and wherein the displaying on the screen the athletes that are selectable for the first player position further comprises displaying on the screen the athletes that are selectable for the first player position along with their associated player value.

7. The method of claim 1, wherein the one or more real-life sporting events comprises two or more real-life sporting events that are scheduled to occur within a predetermined time frame.

8. The method of claim 1, further comprising entering the fantasy team into the fantasy sport contest.

9. The method of claim 1, wherein the first player position is different than the second player position.

10. A method for creating a fantasy sport team, comprising:
receiving by one or more processors data for one or more real-life sporting events that are scheduled to occur, in which athletes play in a plurality of player positions;
receiving by the one or more processors a user input selecting a fantasy sport contest that is associated with the scheduled sporting events and the plurality of athletes;
based on the selected contest, determining by the one or more processors athletes that are selectable for a first player position of the plurality of player positions in the scheduled sporting events;
presenting for display on a screen the athletes that are selectable for the first player position in the scheduled sporting events;

receiving by the one or more processors a user input selecting a first athlete from among the athletes that are selectable for the first player position;
upon the receiving the user input for the selected first athlete and in response thereto:
    determining by the one or more processors athletes that are selectable for the second player position in the scheduled sporting events; and
    automatically presenting for display on the screen the athletes that are selectable for the second player position in the scheduled sporting events;
receiving by the one or more processors a user input selecting a second athlete from among the athletes that are selectable for the second player position; and
presenting for display on the screen a fantasy user team that includes the selected first and second athletes.

11. The method of claim 10, wherein the contest has a value spending limit associated therewith and each of the athletes has an assigned player value, and wherein the presenting for display on the screen the athletes that are selectable for the second player position further comprises presenting for display the athletes that are selectable for the second player position with an indication that they are affordable within a remaining spending amount, the remaining spending amount being the value spending limit less the player value of the first athlete.

12. The method of claim 10, further comprising:
determining by the one or more processors, based on the selected fantasy sport contest, a total number of athletes in the fantasy user team;
determining by the one or more processors whether all of the selected athletes in the fantasy user team are associated with a same real-life sports team; and
if all of the selected athletes are associated with the same sports team, then presenting for display on the screen notification that the fantasy user team cannot be submitted to the fantasy sports contest.

13. The method of claim 10, further comprising:
determining a winner of the contest based on the scheduled sporting events; and
presenting for display at least one winner of the contest, wherein the at least one winner receives an award.

14. A system for creating a fantasy sport team, comprising one or more processors and a non-transitory, computer readable memory, the memory containing executable instructions that, when executed by the one or more processors, cause the one or more processors to:
receive data for one or more real-life sporting events that are scheduled to occur, in which athletes play in a plurality of player positions;
receive a user input for a fantasy sport contest that is associated with the scheduled sporting events and the athletes;
based on the selected contest, determine athletes that are selectable for a first player position of the plurality of player positions in the scheduled sporting events;
present for display the athletes that are selectable for the first player position;
receive a user input selecting a first athlete from among the athletes that are selectable for the first position;
upon receiving the user input selecting the first athlete, and in response thereto:
    automatically determine, free of user input, athletes that are selectable for the second player position of the plurality of positions, and
    automatically present for display on a screen the athletes that are selectable for the second player position in the scheduled sporting event;
receive a user input selecting a second athlete from among the athletes that are selectable for the second player position; and
present for display a fantasy user team that includes the selected first and second athletes.

15. The system of claim 14, further comprising one or more second processors and a second memory, the second memory containing executable instructions that, when executed by the one or more processors, cause the one or more processors to:
receive the user input for a fantasy sport contest that is associated with the one or more real-life sporting events;
display the athletes that are selectable for the first player position;
receive the user input selecting the first athlete;
display the athletes that are selectable for the second player position;
receive the user input selecting a second athlete from among the athletes that are selectable for the second player position; and
display the fantasy user team.

16. The system of claim 14, wherein the contest has a value spending limit associated therewith and each of the athletes has an assigned player value, and wherein the present for display the athletes that are selectable for the second player position further comprises:
present for display the athletes that are selectable for the second player position with an indication that they are affordable within a remaining spending amount, the remaining spending amount being the value spending limit less the player value of the first athlete; and
present for display athletes that are un-selectable for the second player position including athletes that are scheduled to play in the second player position in the scheduled sporting events but having player values that exceed the remaining spending amount, and wherein the athletes that are un-selectable for the second player position are displayed with an indication that they are unaffordable within the remaining spending amount.

17. A method of creating a fantasy sport team, comprising:
receiving, at one or more processors, data for one or more real-life sporting events that are scheduled to occur, in which a plurality of athletes are scheduled to play in first and second player positions;
receiving by the one or more processors a user input for a fantasy sport contest that is associated with the scheduled sporting events and the plurality of athletes;
based on the selected contest, determining by the one or more processors athletes that are scheduled to play in the first player position in the scheduled sporting events;
presenting for display on a screen the athletes that are scheduled to play in the first player position in the scheduled sporting events, wherein the contest has a value spending limit associated therewith and each of the athletes has an assigned player value;
receiving, at the one or more processors, a user input selecting a first athlete;
upon the receiving the user input selecting the first athlete and in response thereto automatically presenting for display on the screen:

a plurality of selectable second athletes that are scheduled to play in the second player position in the scheduled sporting events, the selectable second athletes displayed with an indication that they are affordable within a remaining spending amount, which is a difference between the contest value spending limit and the first athlete's player value, and a plurality of un-selectable second athletes that are scheduled to play in the second player position in the scheduled sporting events, and whose player values exceed the remaining spending amount, the un-selectable second athletes displayed with an indication that they are not affordable within a remaining spending amount;

receiving, at the one or more processors, a user input selecting a second athlete; and presenting for display on the screen a fantasy user team that includes the selected first and second athletes.

18. The method of claim 17, wherein the contest value spending limit comprises a salary limit, and wherein the assigned player values comprise player salaries.

19. The method of claim 17, wherein the displaying the athletes that are scheduled to play in the first player position comprises displaying the athletes along with their associated player value.

20. The method of claim 17, further comprising:

determining by the one or more processors based on the selected fantasy sport contest, a total number of athletes in the fantasy user team;

determining by the one or more processors whether all of the selected athletes in the fantasy user team are associated with a same real-life sports team; and if all of the selected athletes are associated with the same sports team, then presenting for display on the screen notification that the fantasy user team cannot be submitted to the fantasy sports contest.

21. The method of claim 1, wherein the one or more processors determines the second player position based on a received user input selecting the second player position prior to the displaying on the screen athletes that are selectable for the first player position.

* * * * *